(12) United States Patent
Weetman et al.

(10) Patent No.: US 7,882,076 B2
(45) Date of Patent: Feb. 1, 2011

(54) PRIMARY SERVER ARCHITECTURAL NETWORKING ARRANGEMENT AND METHODS THEREFOR

(75) Inventors: Chad R. Weetman, Newark, CA (US); Chung-Ho Huang, San Jose, CA (US)

(73) Assignee: Lam Research Corporation, Fremont, CA (US)

( * ) Notice: Subject to any disclaimer, the term of this patent is extended or adjusted under 35 U.S.C. 154(b) by 1083 days.

(21) Appl. No.: 11/610,687

(22) Filed: Dec. 14, 2006

(65) Prior Publication Data
US 2008/0147668 A1  Jun. 19, 2008

(51) Int. Cl.
G06F 7/00      (2006.01)
G06F 17/00     (2006.01)
G06F 12/00     (2006.01)
G06F 17/30     (2006.01)
G06F 15/173    (2006.01)

(52) U.S. Cl. .................. 707/673; 707/692; 707/830; 709/224

(58) Field of Classification Search .............. None
See application file for complete search history.

(56) References Cited

U.S. PATENT DOCUMENTS

| | | | |
|---|---|---|---|
| 6,634,008 B1 * | 10/2003 | Dole .................. 716/1 |
| 6,735,630 B1 * | 5/2004 | Gelvin et al. .......... 709/224 |
| 6,965,895 B2 | 11/2005 | Smith et al. | |
| 7,123,980 B2 | 10/2006 | Funk et al. | |
| 2002/0016816 A1 * | 2/2002 | Rhoads ................ 709/203 |
| 2002/0087229 A1 | 7/2002 | Pasadyn et al. | |
| 2002/0188678 A1 * | 12/2002 | Edecker et al. ......... 709/204 |
| 2003/0177127 A1 * | 9/2003 | Goodwin et al. ........ 707/10 |
| 2003/0226821 A1 * | 12/2003 | Huang et al. .......... 216/59 |
| 2004/0078219 A1 * | 4/2004 | Kaylor et al. ......... 705/2 |
| 2004/0255024 A1 * | 12/2004 | Jones et al. .......... 709/224 |
| 2005/0165731 A1 * | 7/2005 | Funk .................. 707/1 |
| 2005/0262097 A1 * | 11/2005 | Sim-Tang et al. ....... 707/10 |
| 2006/0015294 A1 * | 1/2006 | Yetter et al. .......... 702/183 |
| 2006/0206223 A1 * | 9/2006 | Huang et al. .......... 700/96 |

FOREIGN PATENT DOCUMENTS

KR   1020010108789 A   12/2001

OTHER PUBLICATIONS

Don Carney; Monitoring Streams; 2002; ACM; pp. 1-12;.*
"International Preliminary Report on Patentability", Issued in PCT Application No. PCT/US2007/086882; Mailing Date: Jun. 25, 2009.
"International Search Report", Issued in PCT Application No. PCT/US2007/086882; Mailing Date: May 19, 2008.
"Written Opinion", Issued in PCT Application No. PCT/US2007/086882; Mailing Date: May 19, 2008.

* cited by examiner

Primary Examiner—Neveen Abel-Jalil
Assistant Examiner—Jermaine Mincey
(74) Attorney, Agent, or Firm—IP Strategy Group, P.C.

(57) ABSTRACT

An arrangement for performing at least one of collecting and analyzing data from a tool cluster configured to process a set of substrates is provided. The arrangement includes a plurality of tools from which at least one tool of the plurality of tools has a chamber for processing at least one of the set of substrates. The arrangement also includes a plurality of secondary servers configured to collect sensor data from the plurality of tools. The arrangement further includes a primary server communicably coupled with the plurality of secondary servers and configured to execute a database management system. The sensor data is indexed using a plurality of indexing applications on the plurality of secondary servers prior to being forwarded to the primary server for use by the database management system. Indexing includes associating a sensor data item with an identity of a server where the sensor data item is stored.

18 Claims, 7 Drawing Sheets

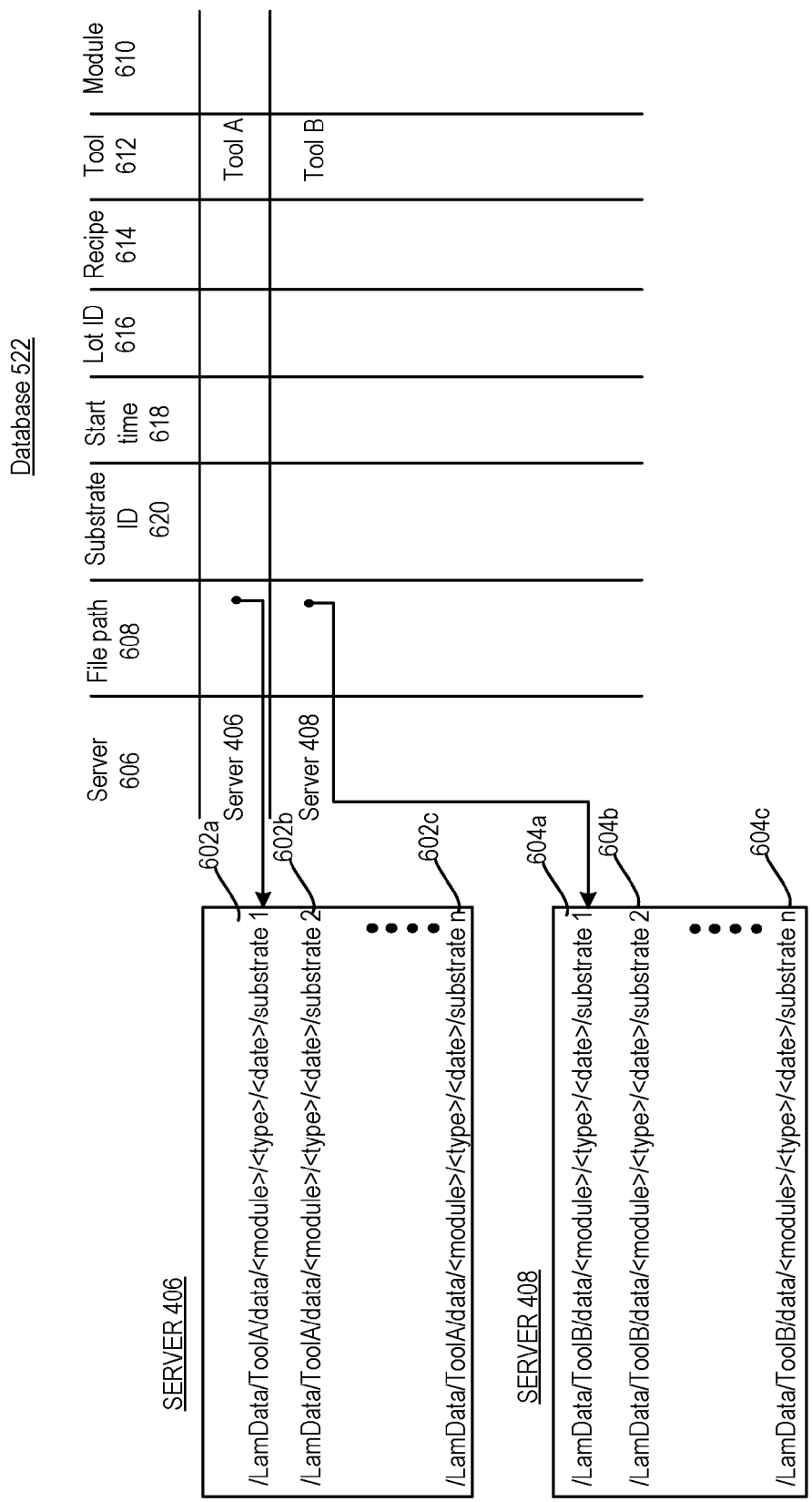

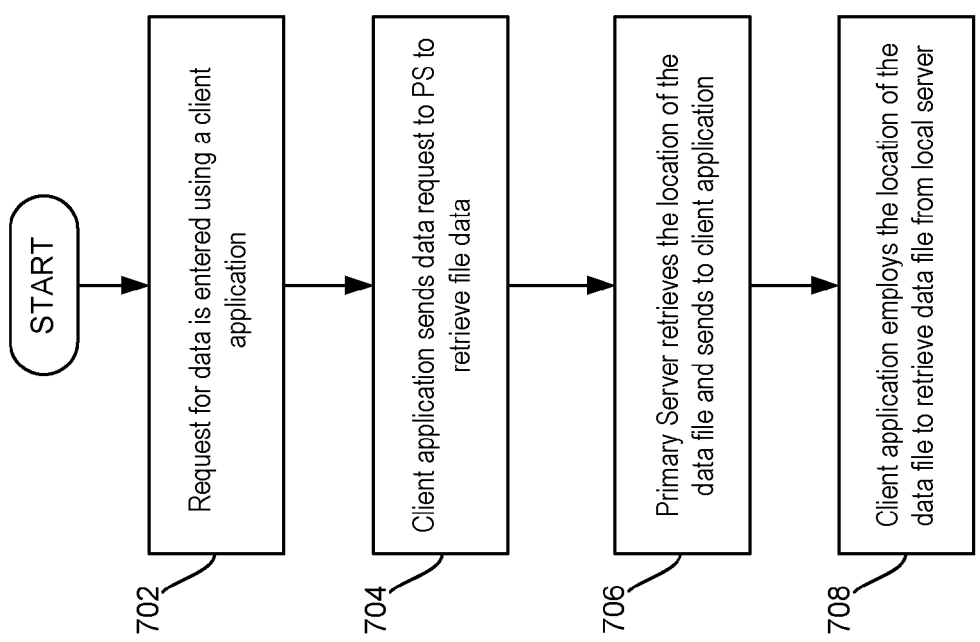

PRIMARY SERVER ARCHITECTURAL NETWORKING ARRANGEMENT AND METHODS THEREFOR

BACKGROUND OF THE INVENTION

Advances in plasma processing have provided for growth in the semiconductor industry. Plasma processing has continued to evolve as manufacturing companies attempt to stay competitive in the semiconductor industry. To be competitive, a manufacturer has to have access to a vast array of data in order to maintain and upkeep its tools and/or to troubleshoot problems that may arise.

During processing, the data (e.g., gas type, temperature, processing time, voltage, pressure, etc.) may be collected. Generally, the data that is gathered for each processed substrate may first be stored at the tool level. Since the tool may have limited memory capacity, the data may be forwarded to a server for storage. The data may be stored at the server until the data is needed for analysis.

In a typical semiconductor environment, a manufacturer may have a plurality of tools connected to a plurality of servers, as shown in FIG. 1. For this semiconductor environment, data collected by each tool (Tool1, Tool2, Tool3, Tool4, Tool5, and Tool6) may be either stored at a server 104 or a server 106. In an example, server 104 may be associated with a tool cluster 108. Tool cluster 108 may include Tool1, Tool2 and Tool 3. Similarly, server 106 may be associated with a tool cluster 110, which may include Tool4, Tool5, and Tool6.

Server 104 and server 106 may have various modules that may be employed to store and/or retrieve the data, as shown in FIG. 2. In an example, data collected during substrate processing by Tool1 of tool cluster 108 may be forwarded to server 104. In server 104, the data may first be stored at a memory 206 (e.g., disk storage, etc.). An indexing application 204 (e.g., Lam AutoArchiver) may then index the data stored at memory 206 and stored the indexed data at a database 208.

In another example, data collected during substrate processing by Tool6 of tool cluster 10 may be forwarded to server 106. In server 106, the data may first be stored at a memory 222 (e.g., disk storage, etc.). An indexing application 220 (e.g., Lam AutoArchiver) may then index the data stored at memory 222 and stored the indexed data at a database 224.

Databases 208 and 224 are examples of full database management systems (e.g., Microsoft SQL Server, Oracle, etc.) capable of handling the different types of data that may be collected during substrate processing. Databases 208 and 224 may index the data that are stored in server 104 and 106, respectively.

FIG. 3 shows an example of indexing for database 208. Data files, which may be stored at a local memory 206, may include a plurality of data files including data files 302a, 302b, 302c, and the like. File path 308, such as /LamData/ToolA/data/<module>/<type>/<date>/substrate 1, for example, may be stored as an index in database 208. In this example, module may refer to a tool module (e.g., processing module, transfer module, etc.). Also, type may include, for example, data lot file, lot history file, optical spectrum file, and the like.

In addition to indexing file path 308, data stored in each data file may also be indexed and stored in database 208. In an example, database 208 may also index the following: module 310 (e.g., processing module, transfer module, etc.), tool 312 (name of the tool and/or identification number of the tool), recipe 314 (recipe used to process the substrate), lot id 316 (identification number for the lot of substrates that had been processed), start time 318 (processing begin time), substrate ID 320 (identification number for the substrate), and the like.

Referring back to FIG. 2, in order for a user to retrieve a data file, the user may have to be able to locate the storage location of the data file. One way the user may be able to locate the data file is by remembering where the data file has been stored. However, as can be seen in FIG. 3, the file path for a data file may be long and difficult to remember. Thus, relying upon a user's memory to locate a data file may be unrealistic, especially if the data has been collected weeks or even months ago. Also, the user that may be requesting for the data file may not be the same person who collected the data.

To facilitate the searching process, software such as Lam DataExplorer (Lam Research Corporation, Fremont, Calif.) may be employed to search for the data file. Even with software such as Lam DataExplorer, for example, the user may still have to dig through a plurality of data files on each server in order to find the exact data file(s) that the user may need in order to perform his analysis.

Consider the situation wherein, for example, during processing on Jun. 10, 2006 from Tool6, a plurality of data has been collected and has been stored on server 106. Two months later, a problem has been identified and to analyze the problem, the data from Jun. 10, 2006 from Tool6 need to be retrieved. To retrieve the data, a user at a computer 102 may have to identify the storage location of the data.

First, the user may search server 104 for the required data files. To search for the data file, the user may employ an open database connectivity (ODBC) application module 214 as an interface to search through the index information about the data stored on database 208. If the data is stored on local memory 206, then the user may be able to retrieve the data file from memory 206 via an ftp server 216. In this example, the data file is not stored on server 104.

Since the data file is not stored on server 104, then the user may next search server 106. Similarly, to search for the data file, the user may employ an ODBC application module 232 as an interface to search through the index information about the data stored on database 224. If the data is stored on local memory 222, then the user may be able to retrieve the data file from memory 222 via an ftp server 230.

Server 104 and server 106 may also include additional modules. These modules enable users at a web browser computer 202 (e.g., Lam Report Browser, Equipment Information Reporter, etc.) to retrieve data files. In an example, the user at web browser computer 202 may want to retrieve a data file. The user may employ a web application 218 to access the indexed data that may be stored on a web-prepared database 212. Data stored on web-prepared database 212 may have been extracted from database 208 and converted into a web format by importer application 210. Similarly, server 106 may include a web application 234, a web-prepared database 228, and an importer application 226.

There are several disadvantages with the prior art architectural arrangement for storing and retrieving data. In an example, a user is responsible for keeping track of the location of the data file. If the user is unable to do so, then the user may have to spend a considerable amount of time searching through a plethora of data files on each server in order to locate and retrieve the required data file. This method of locating a data file can be time consuming and frustrating if the user is working within a large and complex environment.

Also, the cost associated with running a full database management system can become very expensive. First, an expensive licensing fee has to be purchased. Also, expensive computer hardware with sufficient processing power may have to be provided in order to accommodate the type of processing that a full database management system may require. In the prior art architectural arrangement, each server may have to run its own full database management system. Thus, the costs of running multiple databases on multiple servers may quickly compound for a company that has a complex network infrastructure with a plurality of servers

BRIEF DESCRIPTION OF THE DRAWINGS

The present invention is illustrated by way of example, and not by way of limitation, in the figures of the accompanying drawings and in which like reference numerals refer to similar elements and in which:

FIG. 6 shows, in an embodiment of the invention, an example of an index database that account for the primary server architectural network arrangement.

FIG. 7 shows, an embodiment of the invention, a simple flow chart illustrating the steps for retrieving a data file in a primary server architectural networking arrangement.

SUMMARY

Figure 1:
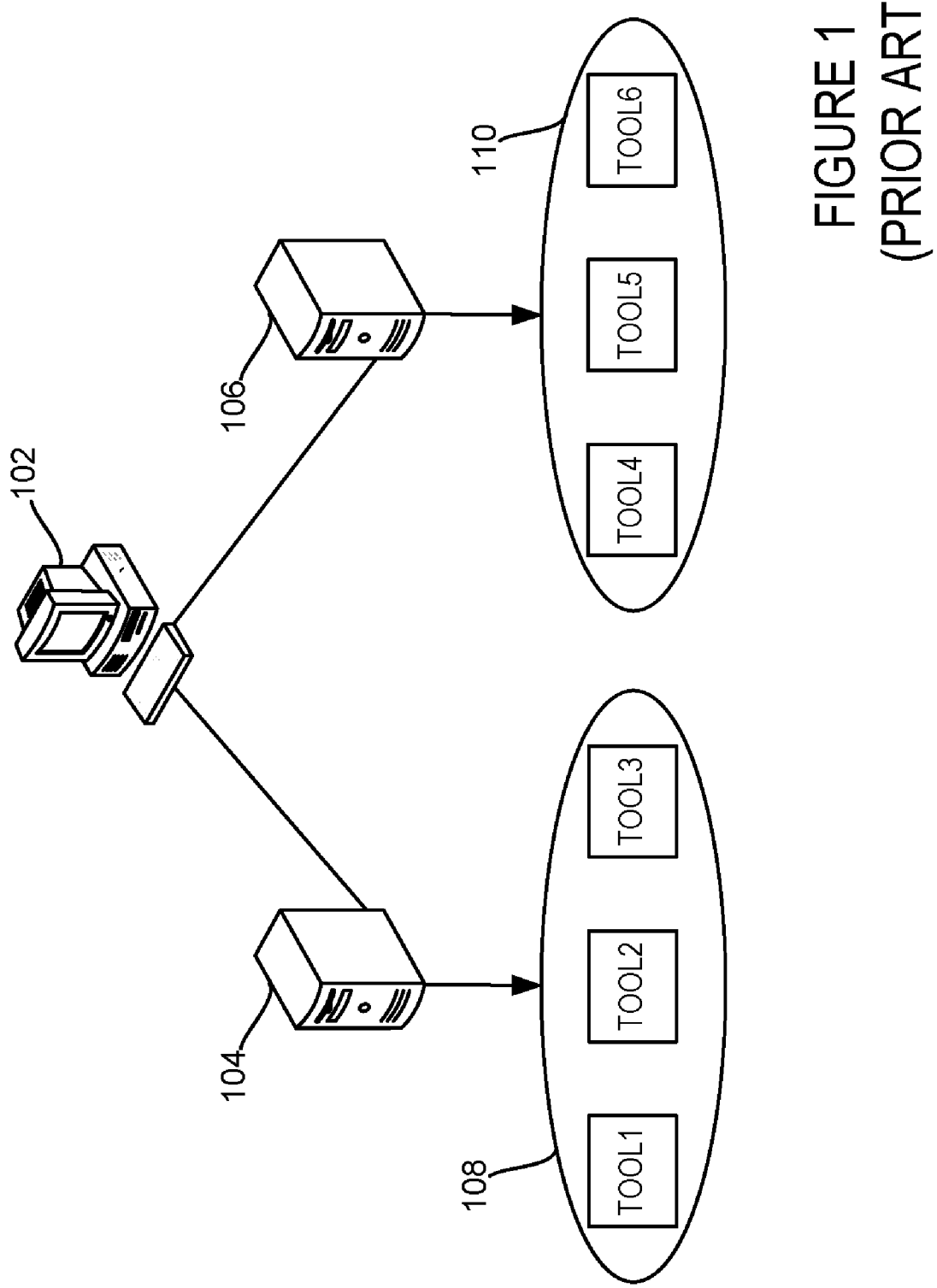
FIG. 1 shows a prior art architectural arrangement in which a plurality of tools may be connected to a plurality of servers.

The invention relates, in an embodiment, to an arrangement for performing at least one of collecting and analyzing data from a tool cluster configured to process a set of substrates. The arrangement includes a plurality of tools. At least one tool of the plurality of tools has a chamber for processing at least one of the set of substrates. The arrangement also includes a plurality of secondary servers configured to collect sensor data from the plurality of tools. Each of the plurality of secondary servers is configured to execute a data indexing application. The arrangement further includes a primary server communicably coupled with the plurality of secondary servers. The primary server is configured to execute a database management system. The sensor data is indexed using a plurality of indexing applications on the plurality of secondary servers prior to being forwarded to the primary server for use by the database management system. Indexing a sensor data item is configured to at least associate the sensor data item with an identity of a server where the sensor data item is stored.

In another embodiment, the invention relates to a method for performing at least one of collecting and analyzing data from a tool cluster configured to process a set of substrates. The method includes collecting sensor data from a plurality of tools. At least one tool of the plurality of tools has a chamber for processing at least one of the set of substrates. The method also includes sending the sensor data to a plurality of secondary servers. The method further includes indexing the sensor data by employing a plurality of indexing applications on the plurality of secondary servers to obtain indexed data. Indexing a sensor data item is configured to at least associate the sensor data item with an identity of a server where the sensor data item is stored. The method yet also includes forwarding the indexed data to a primary server, which is configured to be communicably coupled with the plurality of secondary servers and is configured to execute a database management system.

In yet another embodiment, the invention relates to a computer-implemented method for performing at least one of collecting and analyzing data from a tool cluster configured to process a set of substrates. The computer-implemented method includes collecting sensor data from a plurality of tools. At least one tool of the plurality of tools has a chamber for processing at least one of the set of substrates. The computer-implemented method also includes sending the sensor data to a plurality of secondary servers. The computer-implemented method further includes storing the sensor data at the plurality of secondary servers. The computer-implemented method yet also includes indexing the sensor data by employing a plurality of indexing applications on the plurality of secondary servers. Indexing a sensor data item is configured to at least associate the sensor data item with an identity of a server where the sensor data item is stored. The computer-implemented method yet further includes forwarding the indexing of the sensor data to a primary server, which is configured to be communicably coupled with the plurality of secondary servers and is configured to execute a database management system.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

DETAILED DESCRIPTION OF VARIOUS EMBODIMENTS

The present invention will now be described in detail with reference to various embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover an article of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out operations pertaining to embodiments of the invention. Examples of such apparatus include a general purpose computer and/or a dedicated computing device when appropriately programmed and may include a combination of a computer/computing device and dedicated/programmable circuits adapted for the various operations pertaining to embodiments of the invention.

In accordance with one aspect of the present invention, the inventors herein realized that multiple database management systems are not necessary to manage the plurality of data files that may be located on a plurality of servers. Instead, the inventors realized that by modifying an index database and by reconfiguring the network infrastructure, a simpler, more flexible and more powerful network arrangement may be created that may simplify the search process, reduce user's frustration, and decrease overhead costs.

In accordance with the embodiments of the invention a primary server architecture networking arrangement is provided in which a network infrastructure includes a primary server and a plurality of secondary servers. Embodiments of the invention include storing data files at a plurality of servers and indexing the data files before saving the indexed data to an index database located at the primary server. Embodiments of the invention provide a method for retrieving the data file by entering in one or more search criteria at a single user interface.

In an embodiment of the invention, the primary server may include a database management system (e.g., Microsoft SQL Server, Oracle, etc.), which may be configured to manage the indexed data of the plurality of data files stored in a plurality of servers. The primary server may be connected to a plurality of secondary servers.

In an embodiment of the invention, the primary and the secondary servers include memory for storing a plurality of data files, which may be forwarded from a plurality of tools. In an embodiment, the relationship between the plurality of tools and the plurality of servers may be configured and managed by an overlord indexing application, which may be located at the primary server. Once the relationship has been established, the relationship is forwarded to a plurality of minion indexing applications. This overlord-minion index arrangement may enable configurations of the plurality of tools to the plurality of servers to be consolidated at single server instead of being spread among the various different servers in the network infrastructure. As a result, the process of adding or removing servers/tools may be managed at a single location.

In an embodiment of the invention, data files collected at the plurality of tools may be forwarded to a plurality of servers. Once a data file has been stored at a server, a local indexing application may index the data within the data files. Unlike the prior art, the indexed data is not stored at a local database management system. Instead, the indexed data is forwarded to a centralized database management system located at the primary server.

By having the database management system located on the primary server instead of on each server, cost savings may be realized. In an example, the company may not have to purchase a license for hosting a database for each server. Also, most of the servers may only need to have light weight processors since the secondary servers are not hosting a processor intensive database management system.

Figure 2:
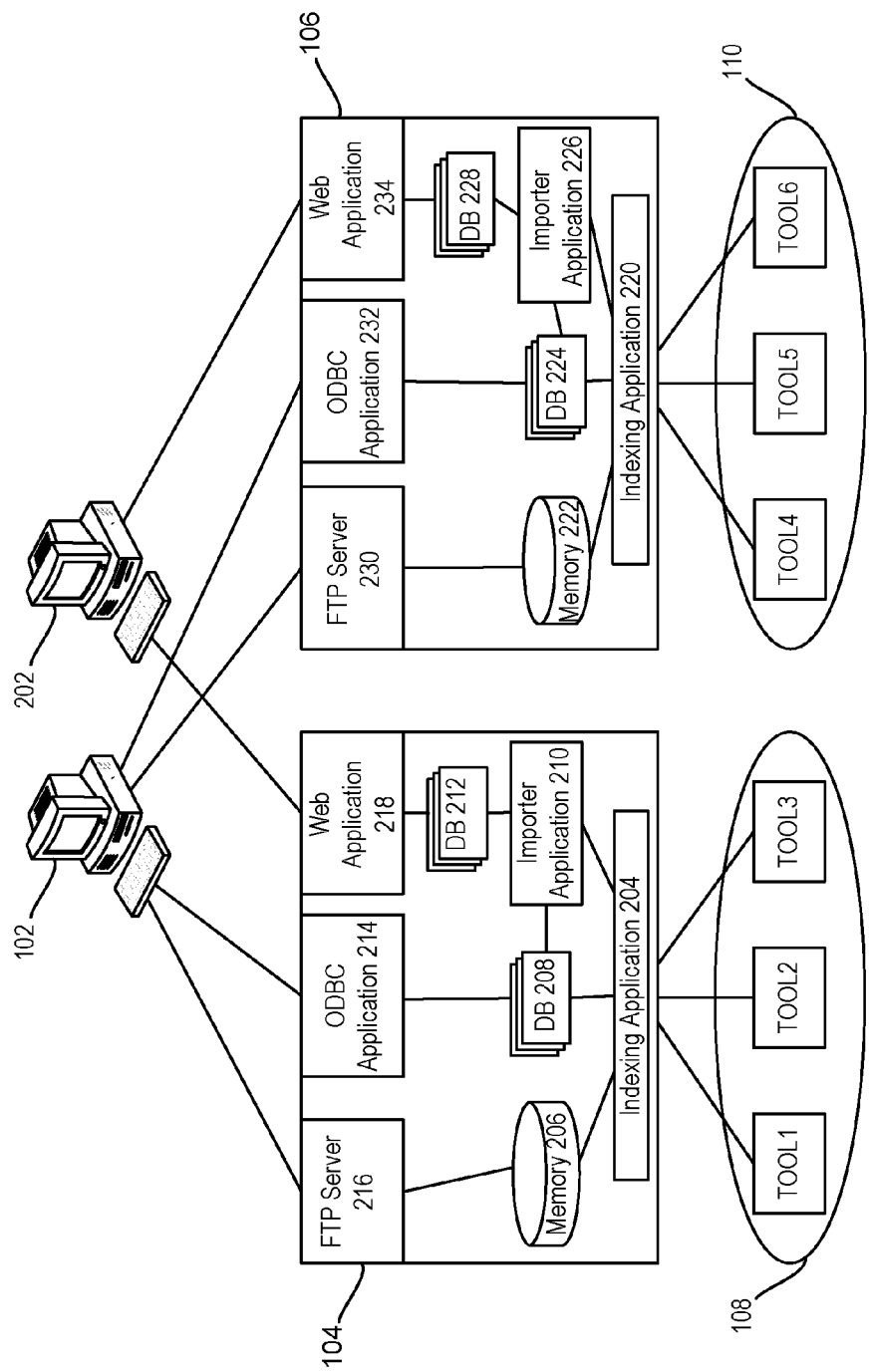
FIG. 2 shows prior art examples of different modules that may exist in a server.
Figure 3:
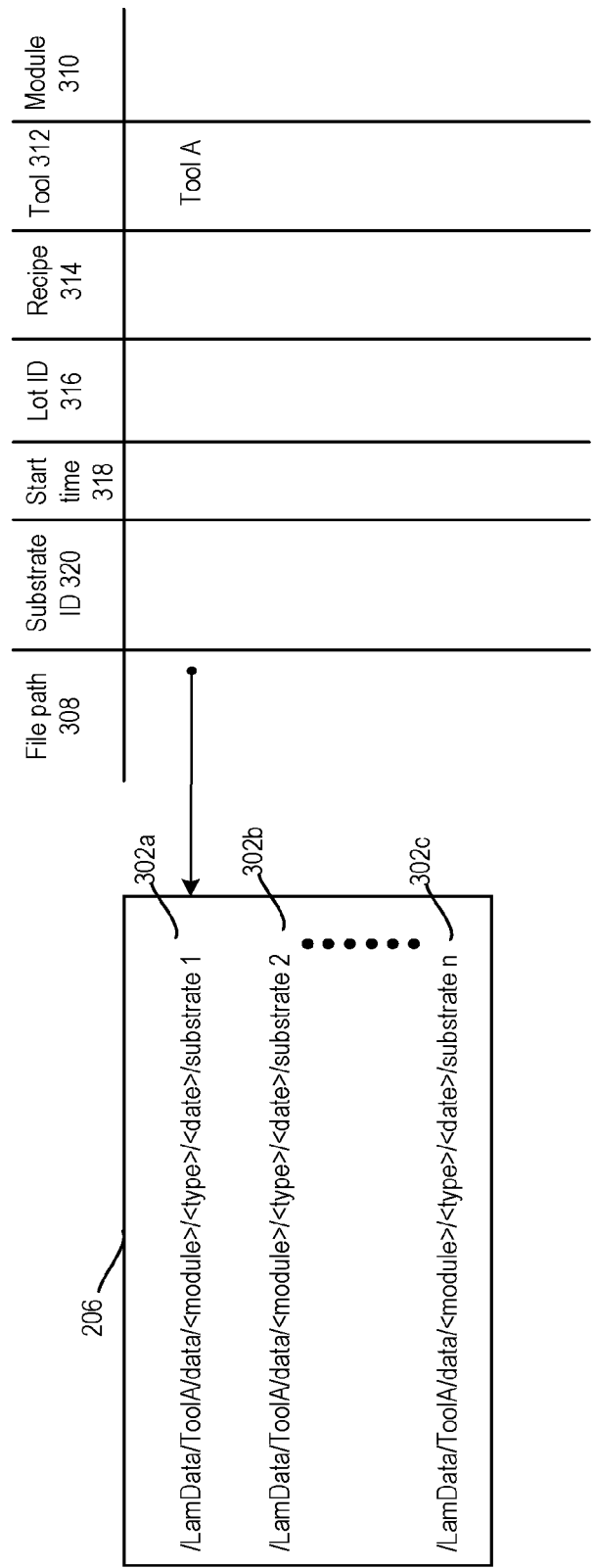
FIG. 3 shows a prior art example of indexing.

In an embodiment of the invention, a web server may be hosted within the primary server architectural arrangement. Thus, additional cost saving may also be realized because web access to indexed data may now be centralized instead of being distributed across a plurality of servers, as shown in prior art FIG. 2.

In an embodiment of the invention, a method is provided for locating and/or retrieving a data file. Consider the situation wherein, for example, a user wants to retrieve a data file about a substrate that was processed by Tool1 five months ago. In the prior art, the task of locating the desired data file can be a long and arduous task that may require a considerable amount of time invested by the user to search a plurality of servers in order to locate the data file. Unlike the prior art, the inventive primary server architectural networking arrangement may enable a user to simply enter a set of search criteria. With these search criteria, the primary server may access the indexed database to find the location of the data file (e.g., file data path and server name). Once the location of the data file has been identified, the user may then easily retrieve the data file. In an embodiment, the process of searching for and retrieving the data file may be automated.

With the primary server architectural networking arrangement, the user is no longer required to remember or understand the network infrastructure in order to locate the desired data file. Thus, the relationships between the plurality of tools and the plurality of servers can now be invisible to the users.

The features and advantages of the invention may be better understood with reference to the figures and discussions that follow.

Figure 4:
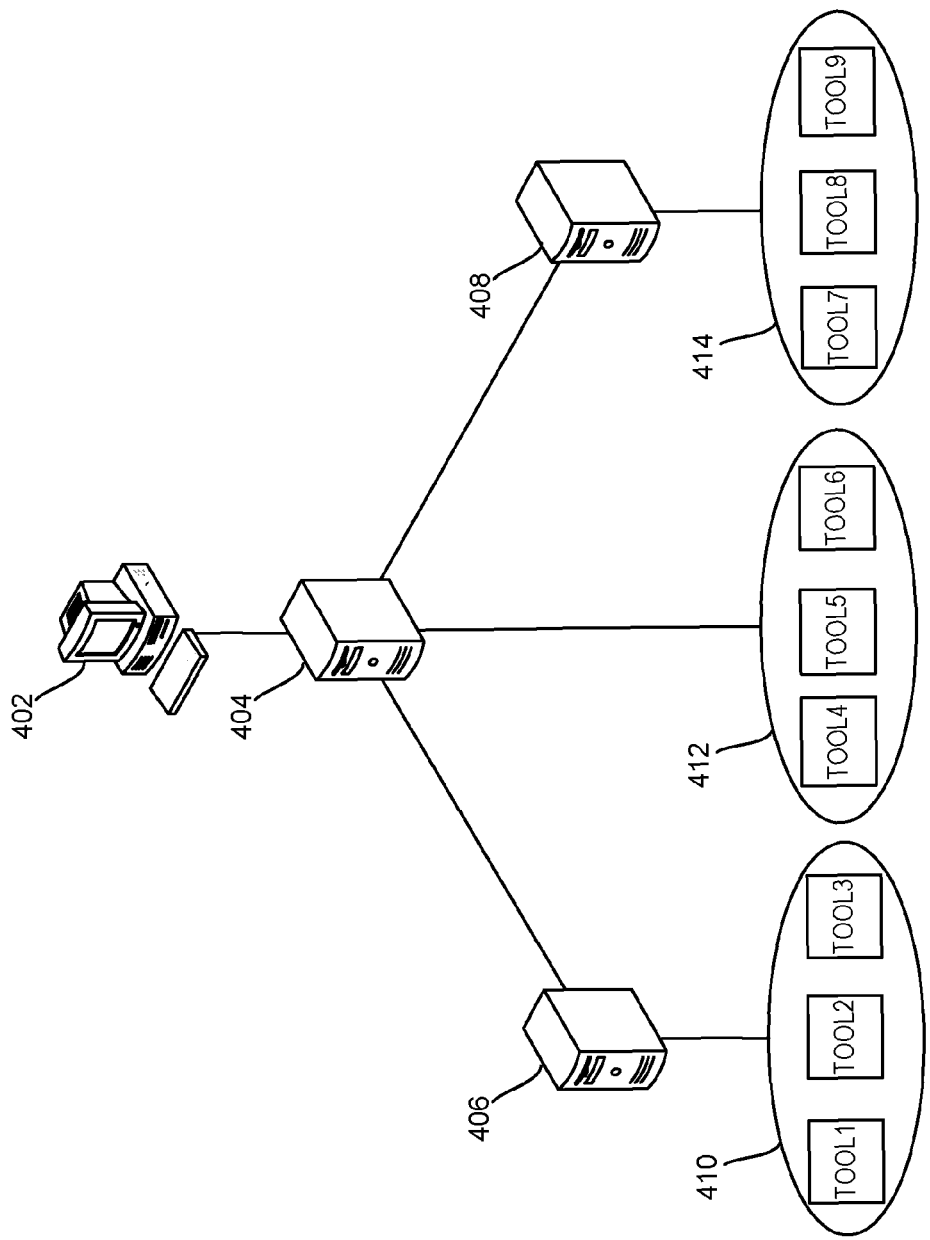
FIG. 4 shows, in an embodiment of invention, an architectural network arrangement in which a primary server is connected to a plurality of secondary servers.

FIG. 4 shows, in an embodiment of invention, an architectural network arrangement in which a primary server is connected to a plurality of secondary servers. In this architectural network arrangement, a primary server 404 is connected to a plurality of secondary servers (406 and 408). In an embodiment, primary server 404 and one or more of plurality of secondary servers (406 and 408) are located in the same location. In an embodiment, primary server 404 is geographically remote from plurality of secondary servers (406 and 408). In an example, primary server 404 is located at the manufacturing company headquarter and plurality of secondary servers (406 and 408) are located at a manufacturing plant. In an embodiment, primary server 404 and plurality of secondary servers (406 and 408) interact with one another via the internet.

Similar to the prior art, each server (primary and the secondary servers) may include storage space for storing the data files collected by the tools (e.g., Tool1, Tool2, Tool3, Tool4, Tool5, Tool6, Tool7, Tool8, Tool9, etc.). In an example, data (e.g., sensor data) collected by a tool cluster 410 (Tool1, Tool2 and Tool3) may be saved on server 406, data collected by a tool cluster 412 (Tool4, Tool5 and Tool6) may be saved on primary server 404, and data collected by a tool cluster 414 (Tool7, Tool8 and Tool9) may be saved on server 408. Note that each tool within a tool cluster does not have to save its data to the same server. Also, a tool does not always have to save its data files to the same server.

However, unlike the prior art, the full database management system is not hosted on all servers. Instead, in an embodiment, the full database management system is hosted by primary server 404. Consider the situation wherein, for example, a user at a computer 402 wants to locate a data file for a substrate04 processed by Tool1 on Aug. 9, 2006. Instead of searching each server until the data file is located, the user at computer 402 may first connect with primary server 404 to search for the data file. Primary server 404 may search its index database to find the file path for the data file. With this file path, the user may quickly locate the desired data file.

Figure 5:
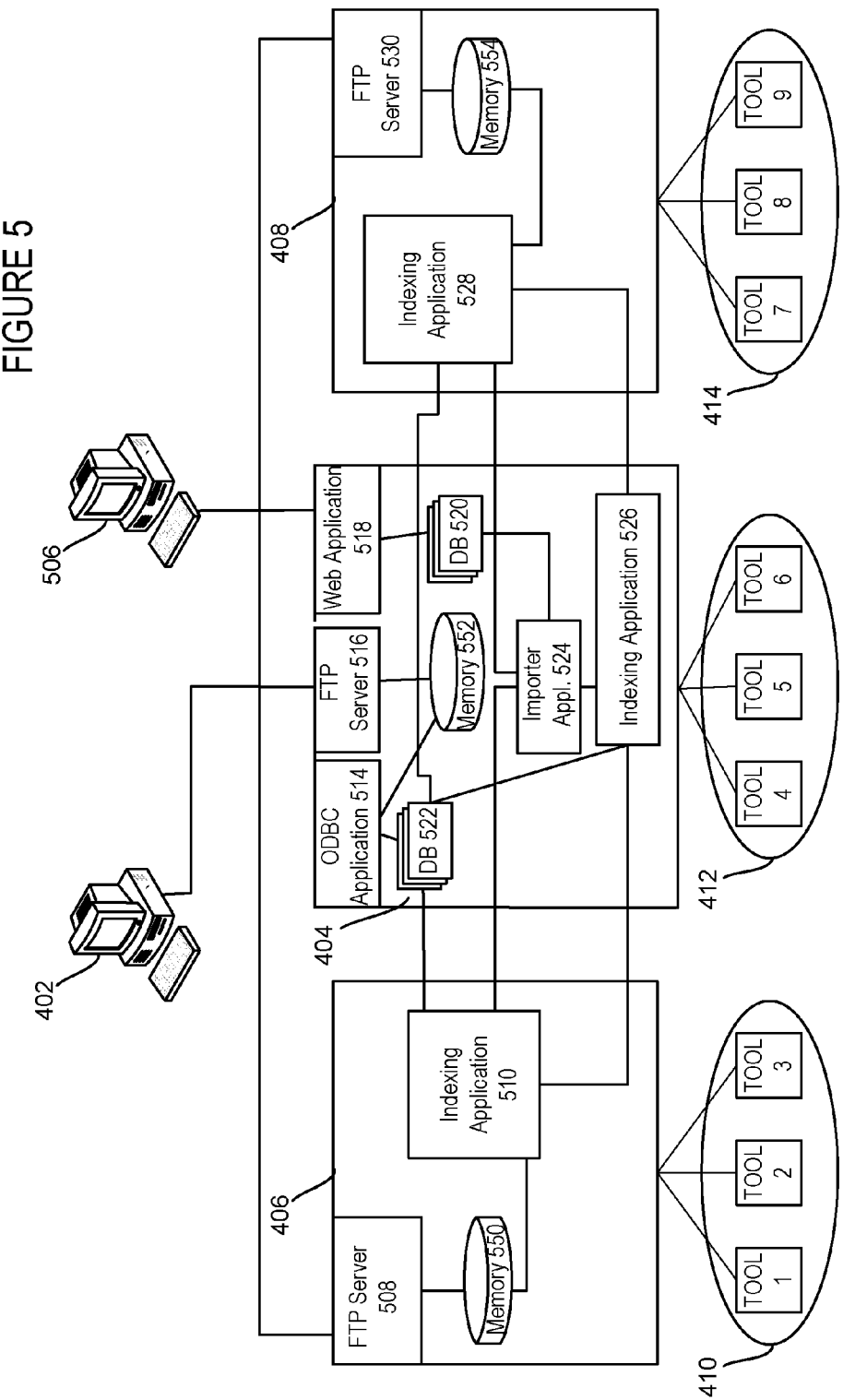
FIG. 5 shows, in an embodiment, examples of the different modules that may be located within each server.

Primary server 404 and secondary servers 406 and 408 include different modules that enable the servers to interact with one another, to store data, and to retrieve data. FIG. 5 shows, in an embodiment, examples of the different modules that may be located within each server.

To connect each tool to a server, each server may have to be configured to accept information from each tool. The process of individually configuring each tool to one or more servers may be a long and tedious process. To simplify the process, an overlord-minion indexing arrangement may be implemented, in an embodiment. In an overlord-minion indexing arrangement, an index application 526 at primary server 404 is set to an overlord mode and the other indexing applications 510 and 528 are set to minion mode. In other words, overlord indexing application 526 may configure how each tool may be associated with each server. Once the configuration has been set up at overlord indexing application 526, the relationship between the tools and the servers may be forwarded to the minion indexing applications 510 and 528.

As aforementioned, each server (primary server 404, secondary servers 406 and 408) may include a storage location (memory 550, memory 552, and memory 554) which may be employed to store the data files forwarded by a tool. Upon receiving the data file, the indexing application (e.g., Lam AutoArchiver) may index the data file. In an example, data collected during substrate processing by Tool1 of tool cluster 410 may be forwarded to server 406 to be stored at memory 550 (e.g., disk storage, etc.). Indexing application 510 may then index the data file. Once the data file has been indexed, the indexed data is forwarded to an index database 522 located in primary server 404.

Unlike the prior art, a full database management system such as index database 522 does not have to be hosted by each server. Instead, the data files may be indexed by a local index application and the information may be sent to a centralized database. The primary server architectural networking arrangement may enable a single full database management system to support a plurality of servers and tools, in an embodiment. Thus, the cost of hosting a full database management system may be reduced since the company does not have to support multiple full database management systems. Further, since most servers in the primary server architectural networking arrangement may not be hosting a full database management system, the cost of hardware may also be significantly reduced since most servers may not be configured as expensive computer hardware with robust processing power.

FIG. 6 shows, in an embodiment of the invention, an example of an index database for a primary server architectural network arrangement.

Data files, which may be stored at server 406 and server 408, may include a plurality of data files including data files 602a, 602b, 602c, 604a, 604b, 604c, and the like. File path 608, such as /LamData/ToolA/data/<module>/<type>/<date>/substrate 1, for example, may be stored as an index in database 522. In this example, module may refer to a tool module (e.g., processing module, transfer module, etc.). Also, type may include, for example, data lot file, lot history file, optical spectrum file, and the like. In addition to file d 608, the index database may also include a server 606 column. The purpose of this column is to identify which server may store the data file.

Similar to the prior art, data stored in each data file may also be indexed and stored in index database 522. In an example, index database 522 may also index the following: module 610 (e.g., processing module, transfer module, etc.), tool 612 (name of the tool and/or identification number of the tool), recipe 614 (recipe used to process the substrate), lot id 616 (identification number for the lot of substrates that had been processed), start time 618 (processing begin time), substrate ID 620 (identification number for the substrate), and the like.

Referring back to FIG. 5, the primary server architectural network arrangement may simplify the process of retrieving a data file, in an embodiment. Consider the situation wherein, for example, a user at computer 402 wants to retrieve a specific data file. In the prior art, the user may either have to know the exact location of the data file or the user may have to search each server until the data file has been located. Unlike the prior art, the task of retrieving a data file is as simple as providing one or more search criteria (e.g., data file name, lot ID, substrate ID, processing time, Tool, module, etc.). In an example, the user may employ a unified access user interface, such as an ODBC application module 514, to search index database 522 for a file path and a server name as the location of the data file. With the file path and server name, the user may then retrieve the desired data file via an ftp server (508, 516, and 530). In an embodiment, the user may be employing software that may automatically retrieve the data file once the file path and server name have been provided.

In an embodiment, primary server 404 may include modules that may facilitate data request from web-based application (e.g., Equipment Information Report, Lam Report Browser, etc.). Consider the situation wherein, for example, a user at a computer 506 wants to retrieve a data file via the internet. The user may employ a web application module 518 as an interface to search a web-index database 520. Web-index database 520 is similar to index database 522 except the data is has been transformed by an importer application module 524 into a format that may be handled by web-based applications.

Similar to index database 522, web-index database 520 is hosted by primary server 404. Thus, additional cost saving may also be realized because web access to indexed data may now be centralized instead of being distributed across a plurality of servers, as shown in prior art FIG. 2. In other words, a multiple server arrangement does not require a web-index database to be hosted on each server resulting in significant cost saving in term of licensing fee and hardware cost.

FIG. 7 shows, an embodiment of the invention, a simple flow chart illustrating the steps for retrieving a data file in a primary server architectural networking arrangement. FIG. 7 will be discussed in relation to FIGS. 4 and 5.

At a first step 702, a request for a data file is entered using a client application (e.g., Lam DataExplorer, Lam FabAccess, Lam Report Browser, Equipment Information Reporter, etc.). In an example, a user at computer 402 enters in one or more search criteria.

At a next step 704, the client application in computer 402 may send the search criteria to primary server 404. In an example, ODBC application module 514 may act as an interface for primary server 404 to receive the search criteria.

At a next step 706, primary server 404 may employ the search criteria to search index database 522 to retrieve the location of the data file. In an embodiment, the location of the data file may include a file data path and a server name.

At a next step 708, the client application at computer 402 may employ the location of the data file to retrieve the desired data file from the server via an ftp server.

As can be appreciated from embodiments of the invention, a primary server architectural networking arrangement provides a cheaper and more flexible solution with less manual intervention.

The cost of implementing a primary server architectural networking arrangement is significantly less than the prior art arrangement. In this inventive arrangement, a full database management system may only reside at a primary server. As a result, multiple license fees are eliminated. Also, since not all servers are hosting a full database management system, the cost associated with heavy-weight server with powerful processing capability is substantially reduced. Further, with a minimal number of full database management system, cost may be further reduced since less human labor may be required to manage the primary server architectural networking arrangement.

In addition, the primary architectural arrangement enables the implementation of a single web server. Thus, users may perform internet search for data files in a central location. Thus, the same type of cost saving that may be had for a full database management system may also be achieved for a single web server arrangement.

With a primary server architectural networking arrangement, manual intervention is minimized. In an example, users may no longer need to understand the network infrastructure in order to locate a data file. In other words, users are no longer burden with performing multiple manual searches at a plurality of different servers in order to locate the desired data file. Instead, the users may be able to retrieve the data file by simply providing one or more search criteria to a primary server.

With the primary server architectural networking arrangement, changes to the networking infrastructure may occur with minimal impact to the users and/or the index database. In an example, the addition of a new server may only require the addition of a new identification number to identify the new server. The users do not need to have the knowledge or understanding that a new server has been added to the architectural networking arrangement.

While this invention has been described in terms of several embodiments, there are alterations, permutations, and equivalents, which fall within the scope of this invention. Also, the title, summary, and abstract are provided herein for convenience and should not be used to construe the scope of the claims herein. Further, in this application, a set of "n" items refers zero or more items in the set. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. An arrangement for performing at least one of collecting and analyzing data from a tool cluster configured to process a set of substrates, said tool cluster including at least a plurality of tools, said plurality of tools including at least a first tool and a second tool, said arrangement comprising:
   a plurality of secondary servers configured to collect sensor data from said plurality of tools, each of said plurality of secondary servers being configured to execute a data indexing application, said plurality of secondary servers including at least a first server and a second server, said first server being configured to store a first set of sensor data collected from said first tool, said first server being further configured to execute a first data indexing application to at least associate said first set of sensor data with an identity of said first server for producing first indexed data, said second server being configured to store a second set of sensor data collected from at least one of said first tool and said second tool, said second server being further configured to execute a second data indexing application to at least associate said second set of sensor data with an identity of said second server for producing second indexed data; and
   a primary server communicably coupled with said plurality of secondary servers, said primary server being configured to execute a database management system, said primary server being further configured to receive said first indexed data from said first server and to receive said second indexed data from said second server, said database management system being configured to store said first indexed data and said second indexed data, said first indexed data including at least said identity of said first server, said second indexed data including at least said identity of said second server, wherein said primary server is configured to include an overlord indexing application for indexing data stored in said primary server, and said plurality of secondary servers is configured to include a plurality of minion indexing applications, said overlord indexing application being configured to define and manage a set of relationships between said plurality of tools and at least one of said primary server and said plurality of secondary servers, said overlord indexing application being further configured to forward said plurality of relationships to said plurality of minion indexing applications.

2. The arrangement of claim 1 wherein said tool cluster is a plasma processing cluster tool.

3. The arrangement of claim 1 wherein said primary server including a unified access user interface, said unified access user interface being configured to receive a search criteria, wherein said primary server is configured to employ said search criteria in searching said database management system to identify a file path and a server name for a data file of a plurality of data files, said database management system being configured to store a plurality of indexed data items about said plurality of data files, said server name being an identity of a server that stores said data file of said plurality of data files, said plurality of indexed data items including at least said file path and said server name.

4. The arrangement of claim 1 wherein said primary server including a web access user interface, said web access user interface being configured to receive a search criteria, wherein said primary server is configured to employ said search criteria in searching said database management system to identify a file path and a server name for a data file of a plurality of data files, said database management system being configured to store a plurality of indexed data items about said plurality of data files, said server name being an identity of a server that stores said data file of said plurality of data files, said plurality of indexed data items including at least said file path and said server name.

5. The arrangement of claim 1 wherein said primary server is configured to collect a third set of sensor data from said plurality of tools, said primary server being configured to execute a third indexing application to index said third set of sensor data.

6. The arrangement of claim 1 wherein said primary server is geographically remote from said plurality of secondary servers and said primary server is connected to said plurality of secondary servers using the internet.

7. A method for performing at least one of collecting and analyzing data from a tool cluster configured to process a set of substrates, said tool cluster including at least a plurality of tools, said plurality of tools including at least a first tool and a second tool, said method comprising:
   collecting sensor data from said plurality of tools, said sensor data including at least a first set of sensor data collected from said first tool, said sensor data further including at least a second set of sensor data collected from at least one of said first tool and said second tool;
   sending said sensor data to a plurality of secondary servers, said plurality of secondary servers including at least a first server and a second server;
   storing said first set of sensor data in said first server;
   storing said second set of sensor data in said second server;
   executing, using said first server, a first data indexing application to at least associate said first set of sensor data with an identity of said first server for producing first indexed data;
   executing, using said second server, a second data indexing application to at least associate said second set of sensor data with an identity of said second server for producing second indexed data;

sending said first indexed data to a primary server, said primary server being communicably coupled with said plurality of secondary servers, said primary server being configured to execute a database management system;

sending said second indexed data to said primary server; and storing said first indexed data and said second indexed data in said database management system, said first indexed data including at least said identity of said first server, said second indexed data including at least said identity of said second server, wherein said primary server is configured to include an overlord indexing application for indexing data stored in said primary server, and said plurality of secondary servers is configured to include a plurality of minion indexing applications, said overlord indexing application being configured to define and manage a set of relationships between said plurality of tools and at least one of said primary server and said plurality of secondary servers, said overlord indexing application being further configured to forward said plurality of relationships to said plurality of minion indexing applications.

8. The method of claim 7 wherein said tool cluster is a plasma processing cluster tool.

9. The method of claim 7 wherein said primary server including a unified access user interface, said unified access user interface being configured to receive a search criteria, wherein said primary server is configured to employ said search criteria in searching said database management system to identify a file path and a server name for a data file of a plurality of data files, said database management system being configured to store a plurality of indexed data items about said plurality of data files, said server name being an identity of a server that stores said data file of said plurality of data files, said plurality of indexed data items including at least said file path and said server name.

10. The method of claim 7 wherein said primary server including a web access user interface, said web access user interface being configured to receive a search criteria, wherein said primary server is configured to employ said search criteria in searching said database management system to identify a file path and a server name for a data file of a plurality of data files, said database management system being configured to store a plurality of indexed data items about said plurality of data files, said server name being an identity of a server that stores said data file of said plurality of data files, said plurality of indexed data items including at least said file path and said server name.

11. The method of claim 7 wherein said primary server is configured to collect a third set of sensor data from said plurality of tools, said primary server being configured to execute a third indexing application to index said third set of sensor data.

12. The method of claim 7 wherein said primary server is geographically remote from said plurality of secondary servers and said primary server is connected to said plurality of secondary servers using the interne.

13. A computer-implemented method for performing at least one of collecting and analyzing data from a tool cluster configured to process a set of substrates, said tool cluster including at least a plurality of tools, said plurality of tools including at least a first tool and a second tool, said method comprising:

collecting sensor data from said plurality of tools, said sensor data including at least a first set of sensor data collected from said first tool, said sensor data further including at least a second set of sensor data collected from at least one of said first tool and said second tool;

storing said first set of sensor data in a first server;

storing said second set of sensor data in a second server;

executing, using said first server, a first data indexing application to at least associate said first set of sensor data with an identity of said first server for producing first indexed data;

executing, using said second server, a second data indexing application to at least associate said second set of sensor data with an identity of said second server for producing second indexed data;

sending said first indexed data to a primary server, said primary server being communicably coupled with said first server and said second server, said primary server being configured to execute a database management system;

sending said second indexed data to said primary server; and storing said first indexed data and said second indexed data in said database management system, said first indexed data including at least said identity of said first server, said second indexed data including at least said identity of said second server, wherein said primary server is configured to include said overlord indexing application for indexing data stored in said primary server, a plurality of secondary servers includes at least said first server and said second server, and said plurality of secondary servers is configured to execute a plurality of minion indexing applications, said overlord indexing application being configured to define and manage a set of relationships between said plurality of tools and at least one of said primary server and said plurality of secondary servers, said overlord indexing application being configured to forward said plurality of relationships to said plurality of minion indexing applications.

14. The computer-implemented method of claim 13 wherein said tool cluster is a plasma processing cluster tool.

15. The computer-implemented method of claim 13 wherein said primary server including a unified access user interface, said unified access user interface being configured to receive a search criteria, wherein said primary server is configured to employ said search criteria in searching said database management system to identify a file path and a server name for a data file of a plurality of data files, said database management system being configured to store a plurality of indexed data items about said plurality of data files, said server name being an identity of a server that stores said data file of said plurality of data files, said plurality of indexed data items including at least said filepath and said server name.

16. The computer-implemented method of claim 13 wherein said primary server including a web access user interface, said web access user interface being configured to receive a search criteria, wherein said primary server is configured to employ said search criteria in searching said database management system to identify a file path and a server name for a data file of a plurality of data files, said database management system being configured to store a plurality of indexed data items about said plurality of data files, said server name being an identity of a server that stores said data file of said plurality of data files, said plurality of indexed data items including at least said file path and said server name.

17. The computer-implemented method of claim 13 wherein said primary server is configured to collect a third set of sensor data from said plurality of tools, said primary server being configured to execute a third indexing application to index said third set of sensor data.

18. The computer-implemented method of claim 13 wherein said primary server is geographically remote from plurality of secondary servers that includes at least said first server and said second server, and said primary server is connected to said plurality of secondary servers using the internet.

* * * * *